(12) United States Patent
Yasutake et al.

(10) Patent No.: US 8,892,229 B2
(45) Date of Patent: Nov. 18, 2014

(54) AUDIO APPARATUS

(75) Inventors: Osamu Yasutake, Kobe (JP); Fumitake Nakamura, Kobe (JP); Nobutaka Miyauchi, Kobe (JP); Masanobu Maeda, Kobe (JP); Masahiko Kubo, Kobe (JP); Nahoko Kawamura, Kobe (JP); Machiko Matsui, Kobe (JP); Hideto Saitoh, Kobe (JP); Hiroyuki Kubota, Kobe (JP); Masayuki Takaoka, Kobe (JP); Masanobu Washio, Kobe (JP); Yutaka Nishioka, Kobe (JP)

(73) Assignee: Fujitsu Ten Limited, Kobe-shi (JP)

(*) Notice: Subject to any disclaimer, the term of this patent is extended or adjusted under 35 U.S.C. 154(b) by 279 days.

(21) Appl. No.: 13/470,811

(22) Filed: May 14, 2012

(65) Prior Publication Data

US 2012/0296459 A1  Nov. 22, 2012

(30) Foreign Application Priority Data

May 17, 2011  (JP) ................................ 2011-110727

(51) Int. Cl.
*G06F 17/00* (2006.01)
*G11B 27/28* (2006.01)
*G11B 27/10* (2006.01)

(52) U.S. Cl.
CPC .............. *G11B 27/105* (2013.01); *G11B 27/28* (2013.01)
USPC .......... 700/94; 348/423.1; 348/465; 348/700; 360/251.3; 369/7; 369/47.1; 369/53.34; 369/59.23; 386/285; 455/161.1; 704/215

(58) Field of Classification Search
CPC ............................... G11B 27/105; G10H 1/40
USPC ............... 369/47.1, 53.34, 59.23, 7; 700/94; 704/215; 705/14; 348/423.1, 465, 700; 360/251.3; 386/285; 455/161.1
See application file for complete search history.

(56) References Cited

U.S. PATENT DOCUMENTS

| 4,805,044 | A | * | 2/1989 | Otsuki ...................... 360/251.3 |
| 6,094,568 | A | * | 7/2000 | Kianush et al. ............ 455/161.1 |
| 6,163,508 | A | * | 12/2000 | Kim et al. ......................... 369/7 |
| 6,363,040 | B1 | * | 3/2002 | Murata ........................ 369/47.1 |

(Continued)

FOREIGN PATENT DOCUMENTS

| CN | 101101590 A | 1/2008 |
| CN | 100517485 C | 7/2009 |
| JP | B2-3775663 | 5/2006 |

OTHER PUBLICATIONS

Aug. 27, 2014 Office Action issued in Chinese Patent Application No. 201210096273.1 (with translation).

*Primary Examiner* — Gerald Gauthier
(74) *Attorney, Agent, or Firm* — Oliff PLC

(57) ABSTRACT

An audio apparatus according to an embodiment includes an audio signal receiving unit, a music gap signal receiving unit, a playback unit, and a determining unit. The audio signal receiving unit receives an audio signal in which successive multiple music data are contained in a single block of data. The determining unit determines a boundary of the music data on the basis of the time at which the music gap signal that indicates the boundary of the music data by the music gap signal receiving unit and the duration of a silent period in the audio signal that is played back by the playback unit.

9 Claims, 6 Drawing Sheets

(56) References Cited

U.S. PATENT DOCUMENTS

| | | | |
|---|---|---|---|
| 6,697,564 B1 * | 2/2004 | Toklu et al. | 386/285 |
| 7,212,483 B2 * | 5/2007 | Kobari et al. | 369/59.23 |
| 7,400,566 B2 * | 7/2008 | Takahashi et al. | 369/53.34 |
| 7,982,797 B2 * | 7/2011 | Zhang | 348/423.1 |
| 8,311,814 B2 * | 11/2012 | Ong et al. | 704/215 |
| 8,538,565 B2 * | 9/2013 | Kawakami et al. | 700/94 |
| 2002/0051077 A1 * | 5/2002 | Liou et al. | 348/465 |
| 2008/0262912 A1 * | 10/2008 | Gargi | 705/14 |
| 2010/0259688 A1 * | 10/2010 | Zoetekouw et al. | 348/700 |
| 2012/0296459 A1 * | 11/2012 | Yasutake et al. | 700/94 |

* cited by examiner

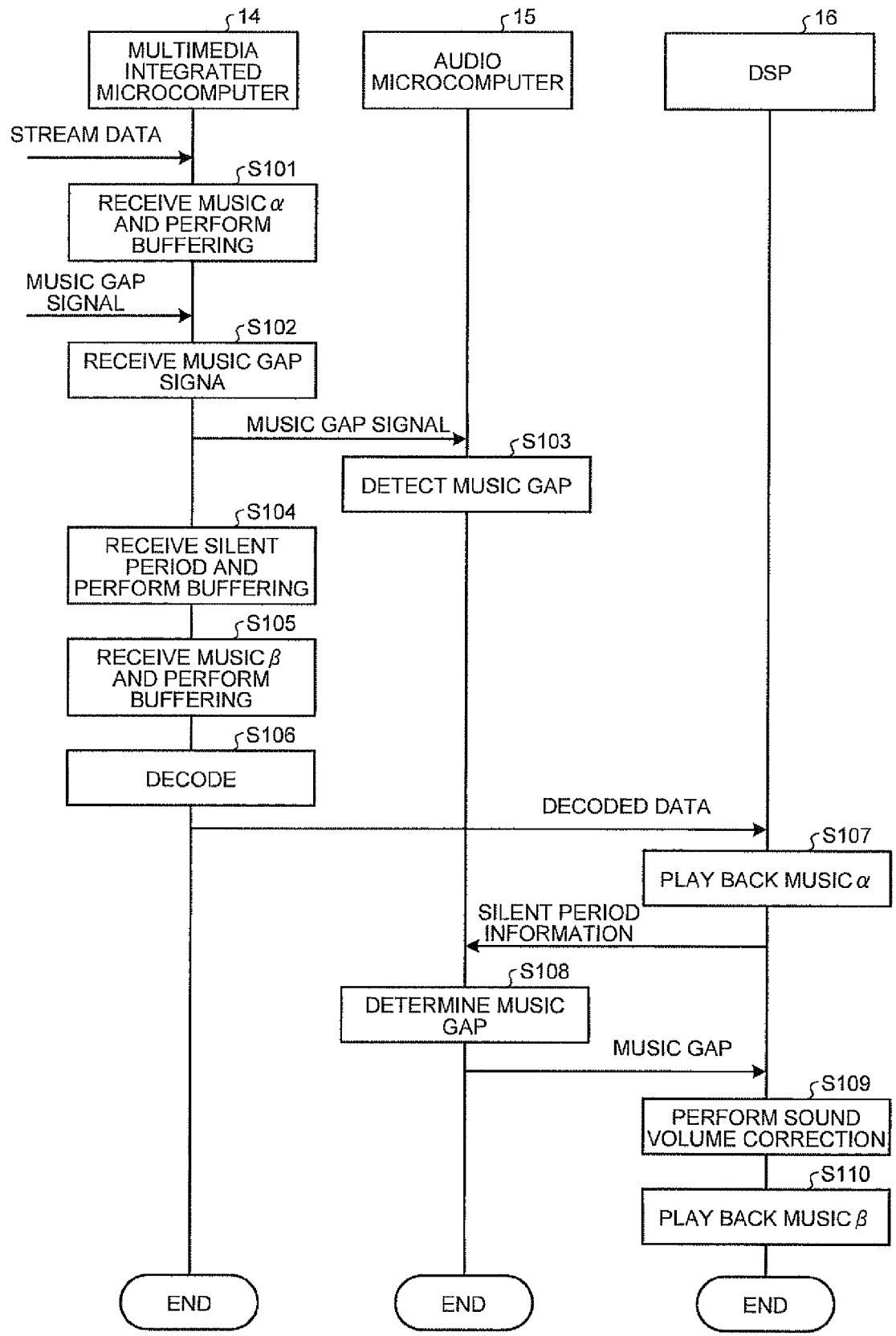

AUDIO APPARATUS

CROSS-REFERENCE TO RELATED APPLICATIONS

This application is based upon and claims the benefit of priority of the prior Japanese Patent Application No. 2011-110727, filed on May 17, 2011, the entire contents of which are incorporated herein by reference.

FIELD

The embodiment discussed herein is directed to an audio apparatus.

BACKGROUND

An audio apparatus is known that plays back media data stored in an external media, such as a universal serial bus (USB) memory, an i-Pod (registered trademark), or a compact disc (CD). The media data mentioned here means, for example, music data or video image data.

An audio apparatus that reads file type data stored in a disk, such as a CD or a CD-Recordable/Rewritable (CD-R/RW) disk, and plays back music data is disclosed.

This kind of audio apparatus detects an music gap signal as information on a change in music (hereinafter, referred to as an "music gap") that is added to each file and plays back each piece of music or skips playing back to skip a track and plays back the subsequent piece of music.

The above described conventional technology is disclosed, for example, in Japanese Patent No. 3775663.

However, with the conventional audio apparatus, there is a problem with stream-type data (hereinafter, referred to as "stream data"), where successive multiple music data are contained in a single block of data, in that the apparatus cannot accurately detect the music gaps.

For example, with the conventional audio apparatus, a predetermined amount of stream data is accumulated (hereinafter, referred to as "buffering") in order to play back the stream data without pausing the sound output. Furthermore, with the conventional audio apparatus, if stream data compressed in a predetermined format is received, playback of sound is performed after restoring (hereinafter, referred to as "decoding") the sound.

Accordingly, because the conventional audio apparatus performs buffering and decoding on the received stream data, a time lag occurs until the time at which the sound is actually played back.

Therefore, with the conventional audio apparatus, a time difference occurs between the time at which a music gap signal indicating a boundary of a music is received and a music gap of a sound that is actually played back. Accordingly, although the time at which the sound is actually played back is not at the time of music gap, the conventional audio apparatus erroneously detects the sound as a music gap.

Accordingly, creating a practical audio apparatus that accurately detects music gaps even in stream-type data, in which successive multiple music data are contained in a single block of data, is a significant problem.

SUMMARY

An audio apparatus according to an aspect of the embodiment includes an audio signal receiving unit, a music gap signal receiving unit, a playback unit, and a determining unit. The audio signal receiving unit receives an audio signal in which successive multiple music data are contained in a single block of data. The music gap signal receiving unit receives a music gap signal that indicates a boundary of the music data. The playback unit plays back the audio signal received by the audio signal receiving unit. The determining unit determines the boundary of the music data on the basis of the time at which the music gap signal is received by the music gap signal receiving unit and the duration of a silent period in the audio signal that is played back by the playback unit.

BRIEF DESCRIPTION OF DRAWINGS

The present invention as well as a more complete understanding and advantages thereof will be easily made apparent from a study of the following detailed description of the invention in connection with the accompanying drawings.

FIG. 6 is a sequence diagram illustrating the outline of the flow of a stream data playback process.

DESCRIPTION OF EMBODIMENTS

A preferred embodiment of an audio apparatus will be described in detail below with reference to the accompanying drawings. The present invention is not limited to the embodiment described below.

In the following, first, the outline of the audio apparatus according to the embodiment will be described with reference to FIG. 1. Then, the configuration of the audio apparatus according to the embodiment will be described with reference to FIGS. 2 to 6.

Figure 1A:
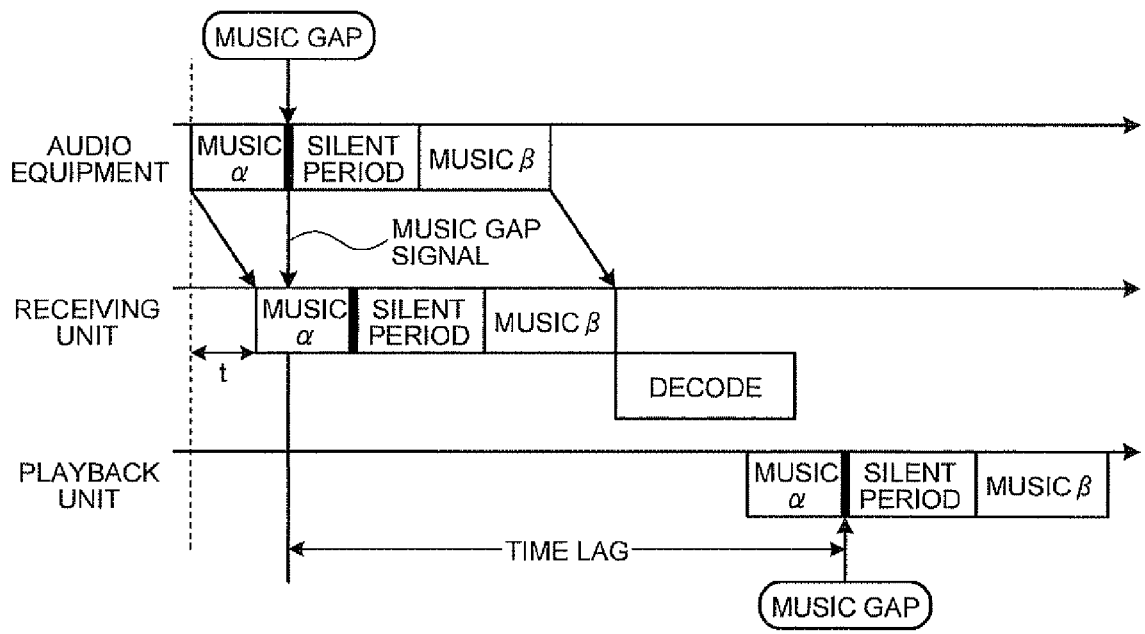
FIGS. 1A and 1B are schematic diagrams each illustrating the outline of the operation of an audio apparatus according to an embodiment.
Figure 1B:
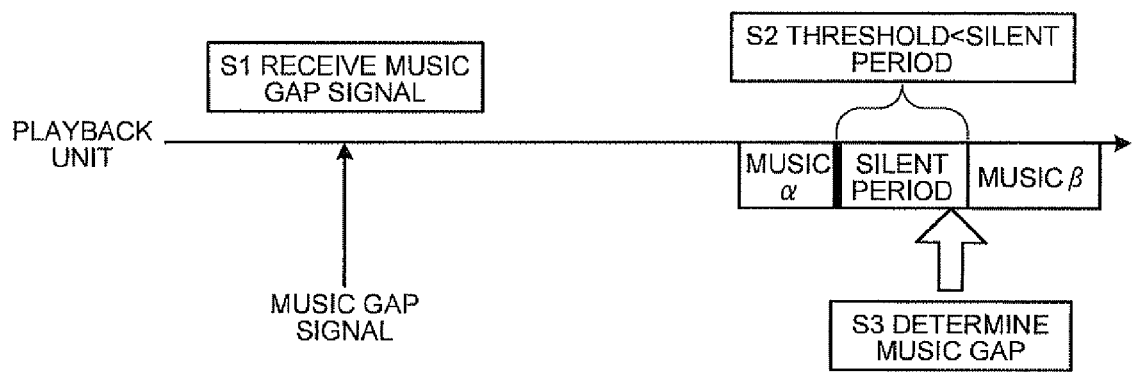

FIG. 1 is a schematic diagram illustrating the outline of the operation of the audio apparatus according to the embodiment. FIG. 1A illustrates a problem with a conventional audio apparatus. FIG. 1B illustrates a feature of the audio apparatus according to the embodiment.

The main characteristic of the audio apparatus according to the embodiment is that, if stream data is received, if an music gap signal indicating a music gap is received, and if a predetermined silent period has elapsed, the audio apparatus determines that there is a music gap of a sound that is actually played back.

The stream data mentioned here means a type of data in which successive multiple music data are contained in a single block of data. In the embodiment, a period of time during which an audio signal of stream data indicates silence is referred to as a "silent period".

Some conventional audio apparatuses plays back sound by receiving stream data stored in an external media, such as a universal serial bus (USB) memory audio or an i-Pod (registered trademark) and these apparatuses are becoming widely used.

FIG. 1A illustrates a case in which a receiving unit of a conventional audio apparatus receives a piece of music α of stream data, a silent period, and a piece of music β of stream data and a playback unit of the conventional audio apparatus plays back the sounds. The horizontal axis illustrated in FIG.

1A indicates the time. In this case, a portion between the music α and the silent period is defined as an music gap. Furthermore, in FIG. 1, to emphasize the silent period, the length of the silent period is made long.

As illustrated in FIG. 1A, the audio equipment sequentially transmits, to the receiving unit according to the conventional audio apparatus, the music α, the silent period, and the music β. Furthermore, the audio equipment transmits, to the receiving unit, the music gap signal at the point near the end of the music α.

In contrast, because the receiving unit according to the conventional audio apparatus plays back the stream data without pausing the sound output, the receiving unit performs buffering on a predetermined stream data and performs, in buffering units, the following process. In the following, a case will be described in which the buffering is performed on the data from the music α to the music β.

As illustrated in FIG. 1A, the start time of the buffering of the stream data performed by the receiving unit according to the conventional audio apparatus is delayed by the communication time (t) that corresponds to a period of time from when the stream data is transmitted from the audio equipment to when the audio apparatus receives it.

Then, after receiving the music α, the receiving unit according to the conventional audio apparatus performs buffering, from the audio equipment, on the stream data from the silent period to the music β.

The stream data is usually compressed in a predetermined format. Accordingly, the receiving unit according to the conventional audio apparatus decodes the buffered stream data. Then, the playback unit according to the conventional audio apparatus plays back the decoded music.

Furthermore, the transmission path of the stream data is different from that of the music gap signal. Accordingly, the time at which the playback unit according to the conventional audio apparatus receives a music gap signal is not always delayed by the time t. Here, a description will be given with the assumption that the receiving unit receives the music gap signal without a delay.

After receiving the stream data, the playback unit according to the conventional audio apparatus takes time to buffer and decode before the sound is played back. Accordingly, with the playback unit according to the conventional audio apparatus, the silent period is played back after the time at which the music gap signal is received. The length of the processing period of the buffering and the decoding varies depending on the buffering.

Specifically, as illustrated in FIG. 1A, with the playback unit according to the conventional audio apparatus, an irregular time lag occurs between the time at which the music gap signal is received and the music gap of a sound that is actually played back.

Accordingly, malfunctioning occurs if the audio apparatus performs some control when receiving a music gap signal. For example, the audio apparatus adjusts the sound volume of music data (hereinafter, referred to as "sound volume correction") for each piece of music α nd plays back the sound.

If a music gap is not accurately detected at this stage, sound volume correction for each piece of music is not properly performed in the audio apparatus, causing a user to feel uncomfortable. Accordingly, it is preferable that the music gaps in stream data be accurately detected.

Furthermore, some music has many silent periods during a predetermined period of time, causing a case of erroneous detection of a music gap even though music is actually being played. Accordingly, the present invention has been conceived in light of the circumstances described above, and the audio apparatus according to the embodiment determines a music gap in accordance with the duration of a silent period that is actually added and in accordance with whether a music gap signal is received.

Specifically, as illustrated in FIG. 1B, if the audio apparatus according to the embodiment receives a music gap signal (see (S1) of FIG. 1B) and if the duration of the silent period in the received stream data is longer than a predetermined period of time (see (S2) of FIG. 1B), the audio apparatus according to the embodiment determines that the silent period is a music gap (see (S3) of FIG. 1B).

Accordingly, even if the audio apparatus according to the embodiment receives stream-type data, in which successive multiple music data are contained in a single block of data, the audio apparatus according to the embodiment can accurately detect a music gap.

Furthermore, if the audio apparatus according to the embodiment is used in a sound volume correction process, by accurately detecting the music gap described above, the audio apparatus can appropriately performs sound volume correction even if data is stream data.

Figure 2:
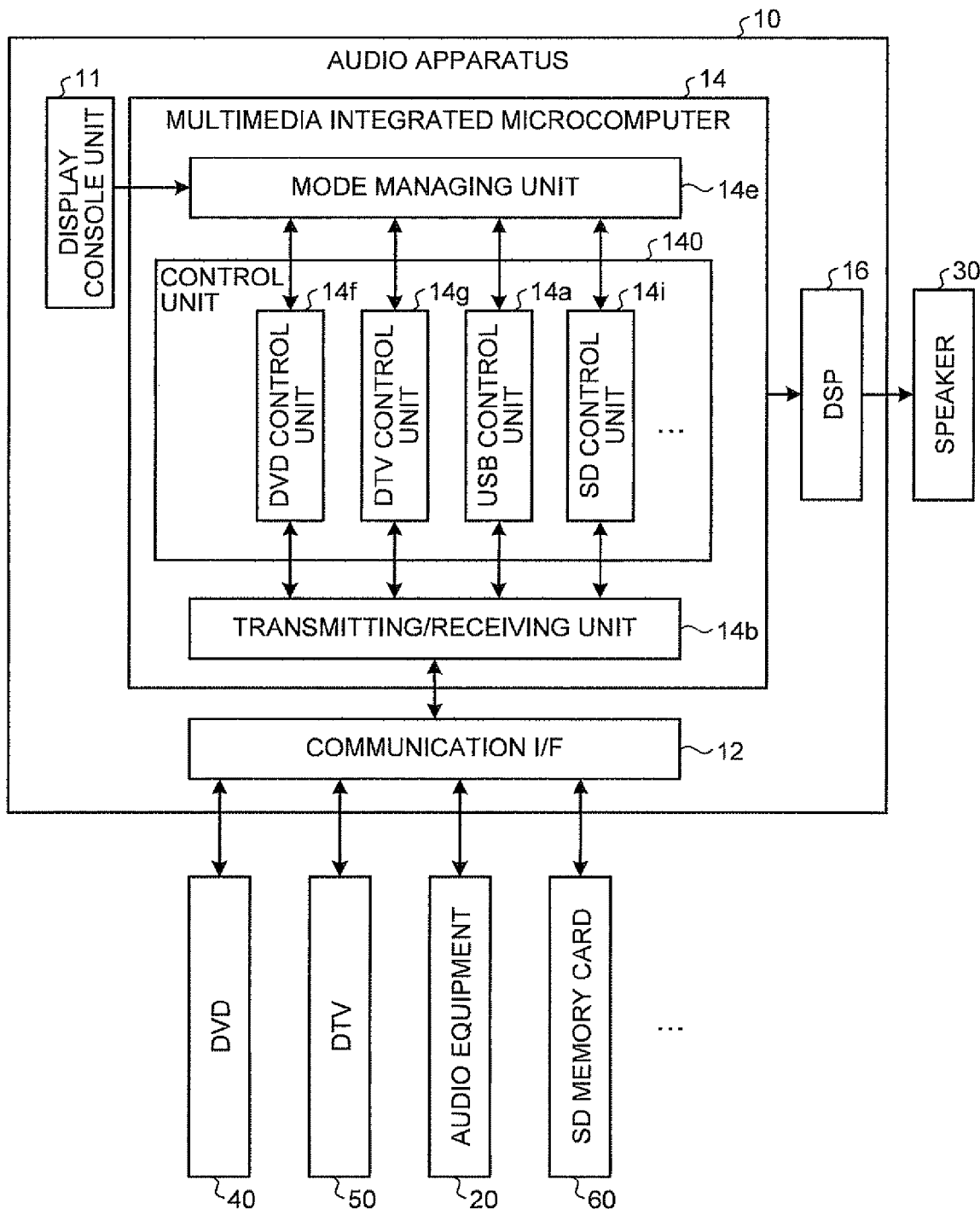
FIGS. 2 and 3 are block diagrams each illustrating the configuration of the audio apparatus according to the embodiment.
Figure 3:
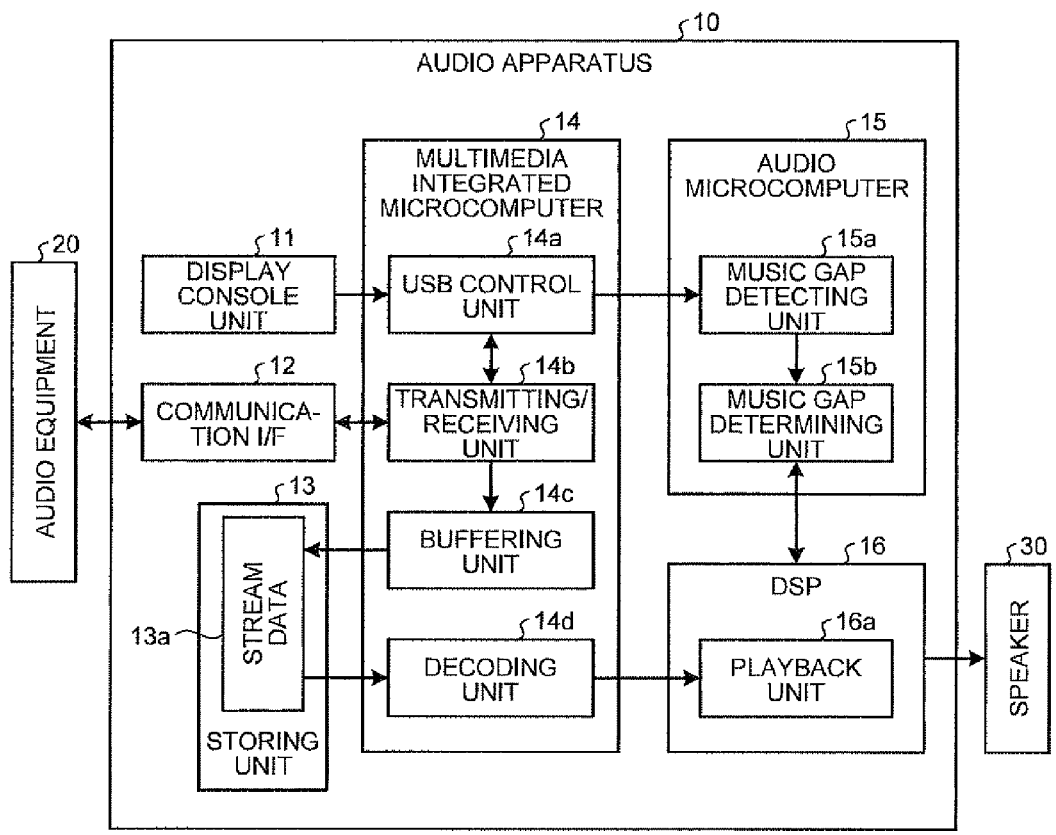

In the following, an embodiment of the audio apparatus according to the embodiment, which is described above with reference to FIG. 1, will be described in detail. First, the configuration of an audio apparatus 10 according to the embodiment will be described with reference to FIGS. 2 and 3. FIG. 2 is a block diagram illustrating the configuration of the audio apparatus 10 (No. 1). FIG. 3 a block diagram illustrating the configuration of the audio apparatus 10 (No. 2).

Furthermore, in FIG. 2, the outline of the audio apparatus 10 will be described. In FIG. 3, components needed to describe the feature of the audio apparatus 10 will be described.

First, as illustrated in FIG. 2, the audio apparatus 10 includes a display console unit 11, a communication I/F (interface) 12, a multimedia integrated microcomputer 14, and a digital signal processor (DSP) 16.

The multimedia integrated microcomputer 14 includes a mode managing unit 14e, a control unit 140, and a transmitting/receiving unit 14b. The control unit 140 includes a digital versatile disk (DVD) control unit 14f, a digital television (DTV) control unit 14g, a USB control unit 14a, and a secure digital (SD) control unit 14i.

A DVD 40, a DTV 50, audio equipment 20, and a secure digital memory card (SD memory card) 60 are connected to the audio apparatus 10.

The display console unit 11 is, for example, an input/output device, such as a touch panel display, and is constituted by a display unit, which displays the type of media data that is being played back, and by an operating unit that switches or plays back media data.

The communication I/F 12 is configured as a device that allows communication with another device that stores therein various kinds of media data. For example, the communication I/F 12 performs data transmission/reception between the DVD 40 and the multimedia integrated microcomputer 14.

The multimedia integrated microcomputer 14 is a control unit that performs the overall control of the audio apparatus 10. Specifically, the multimedia integrated microcomputer 14 receives media data that is selected by a user using a selecting operation and outputs the media data to the DSP 16 that plays back the media data.

The mode managing unit 14e manages the type of media data that is switched by a user using the selecting operation. If the mode managing unit 14e receives instructions to perform operations via the display console unit 11, the mode managing unit 14e assigns a process to a control unit associated with a device in accordance with the type of media data that is being played back or that is selected.

For example, if the mode managing unit 14e receives an instruction to perform the playback operation of the DVD 40, the mode managing unit 14e receives media data from the DVD 40 and instructs the DVD control unit 14f to perform a playback process.

The control unit 140 controls each media data. Specifically, the DVD control unit 14f controls the playback of the media data stored in the DVD 40. The DTV control unit 14g controls the receiving and the playback of the broadcast wave of the DTV received from the DTV 50.

The USB control unit 14a controls the playback of the media data stored in the audio equipment 20. The SD control unit 141 controls the playback of the media data stored in the SD memory card 60. In this case, the audio equipment 20 stores therein, for example, stream data of an i-Pod (registered trademark).

The transmitting/receiving unit 14b is a processing unit that performs, via the communication I/F 12, transmitting/receiving of data, such as media data or music information, between each device.

The audio apparatus 10 sends, to the DSP 16, the media data that is stored in each device received by the transmitting/receiving unit 14b and plays back the media data. The DSP 16 is a processing unit that performs a process for playing back an audio signal by sending, to a speaker 30 via an amplifier (not illustrated), the media data received from the multimedia integrated microcomputer 14.

However, the components of the audio apparatus 10 illustrated in FIG. 2 are not limited thereto. For example, by using near field radio communication, such as Bluetooth (registered trademark), media data received from, for example, a mobile phone terminal may also be played back.

In the following, components needed to describe the feature of the audio apparatus 10 will be described with reference to FIG. 3.

As illustrated in FIG. 3, the audio apparatus 10 includes a display console unit 11, the communication I/F 12, a storing unit 13, the multimedia integrated microcomputer 14, an audio microcomputer 15, and the DSP 16.

The multimedia integrated microcomputer 14 further includes the USB control unit 14a, the transmitting/receiving unit 14b, a buffering unit 14c, and a decoding unit 14d. The audio microcomputer 15 includes a music gap detecting unit 15a and a music gap determining unit 15b.

The DSP 16 includes a playback unit 16a. The storing unit 13 stores therein stream data 13a. The audio equipment 20 and the speaker 30, which are insertable/removable, are connected to the audio apparatus 10.

The display console unit 11 is an input/output device, such as a touch panel display and is made up of a display unit, which displays the name of the music that is being played back, and an operating unit that plays back or skips the music.

If the display console unit 11 receives an instruction to perform a predetermined operation with respect to the audio equipment 20, the display console unit 11 sends the content of the operation to the USB control unit 14a. The components included in the display console unit 11 are not limited thereto. For example, the display unit may also be configured as a separate unit to the operating unit.

The communication I/F 12 is configured as a device that allows communication with another device and performs data transmission/reception between, for example, the audio equipment 20 and the multimedia integrated microcomputer 14.

The storing unit 13 is configured as a storage device, such as a nonvolatile memory or a hard disk drive. For example, the storing unit 13 stores therein the stream data 13a that is received from the audio equipment 20 via the transmitting/receiving unit 14b and the buffering unit 14c. Furthermore, the storing unit 13 may also be a volatile memory.

The multimedia integrated microcomputer 14 is a control unit that performs overall control of the audio apparatus 10. The USB control unit 14a controls the playback of the stream data stored in the audio equipment 20 that is connected to the audio apparatus 10.

Specifically, if the USB control unit 14a receives, from the display console unit 11 via the mode managing unit 14e (not illustrated), the playback operation of the music data stored in the audio equipment 20, the USB control unit 14a instructs the transmitting/receiving unit 14b to receive the music data.

The USB control unit 14a receives, via the transmitting/receiving unit 14b, a music gap signal that is transmitted from the audio equipment 20 and also sends it to the music gap detecting unit 15a. Music gap signald will be described in detail with reference to FIG. 4 later.

The transmitting/receiving unit 14b is a processing unit that performs data transmission/reception with the audio equipment 20 via the communication I/F 12.

For example, the transmitting/receiving unit 14b receives the stream data stored in the audio equipment 20 and sends it to the buffering unit 14c. Furthermore, if the transmitting/receiving unit 14b receives a music gap signal from the audio equipment 20, the transmitting/receiving unit 14b sends the music gap signal to the USB control unit 14a.

The buffering unit 14c is a processing unit that allows the storing unit 13 to temporarily store the stream data received from the transmitting/receiving unit 14b.

If the size of the stream data 13a stored in the storing unit 13 becomes greater than a predetermined size, the decoding unit 14d decodes the stream data 13a and sends the decoded music data to the playback unit 16a.

If the audio apparatus 10 receives stream data from the audio equipment 20, sequentially decodes the data without buffering, and plays back the music data, the sound to be played back is sometimes paused.

The reason for this is that, if the decoding speed is slower than the playback speed at a certain time, the decoded music data that is played back by the playback unit 16a is temporarily lost, and thus the sound to be played back is paused. Accordingly, as described above, it is possible to prevent the sound from being paused by buffering the stream data.

The audio microcomputer 15 is a control unit that controls music data from among the music data or the video image data controlled by the audio apparatus 10.

The music gap detecting unit 15a is a processing unit that receives, from the audio equipment 20 via the USB control unit 14a, a music gap signal and sends it to the music gap determining unit 15b.

The music gap determining unit 15b is a processing unit that determines whether a portion is a music gap on the basis of the music gap signal received from the music gap detecting unit 15a and on the basis of information on the duration of the silent period of the music data that is played back by the playback unit 16a.

Furthermore, if the music gap determining unit 15b determines that the portion is a music gap, the music gap determining unit 15b also notifies the DSP 16 of the music gap. The music gap determining process performed by the music gap determining unit 15b will be described in detail later with reference to FIG. 5.

The DSP 16 is a processing unit that plays back the decoded music data received from the decoding unit 14d. Furthermore, if the DSP 16 plays back the data, the DSP 16 also performs, for each piece of music, a correction process on the sound volume or an adjusting process on the audio signal in order to play back the audio signal at an appropriate sound volume for the user.

Specifically, if the DSP 16 receives a notification from the music gap determining unit 15b indicating that the portion is a music gap, the DSP 16 performs the sound volume correction or adjustment on the audio signal of the subsequent music data.

The playback unit 16a is a processing unit that plays back music data by sending, to the speaker 30, the audio signal that has been adjusted or that has been subjected to the sound volume correction by the DSP 16.

Furthermore, the playback unit 16a also sends, to the music gap determining unit 15b, the information on a silent period of the music data that is being played back. The information on the silent period may also be the sound volume of the music data that is being played back and may also be music data itself that is being played back. The speaker 30 outputs, as sound information, the audio signal received from the DSP 16.

Furthermore, processes performed by the multimedia integrated microcomputer 14 may also be performed by the audio microcomputer 15, and processes performed by the audio microcomputer 15 may also be performed by the multimedia integrated microcomputer 14.

For example, the stream data 13a that is buffered by the multimedia integrated microcomputer 14 may also be decoded by the audio microcomputer 15 and the decoded music data may also be sent to the DSP 16.

Figure 4:
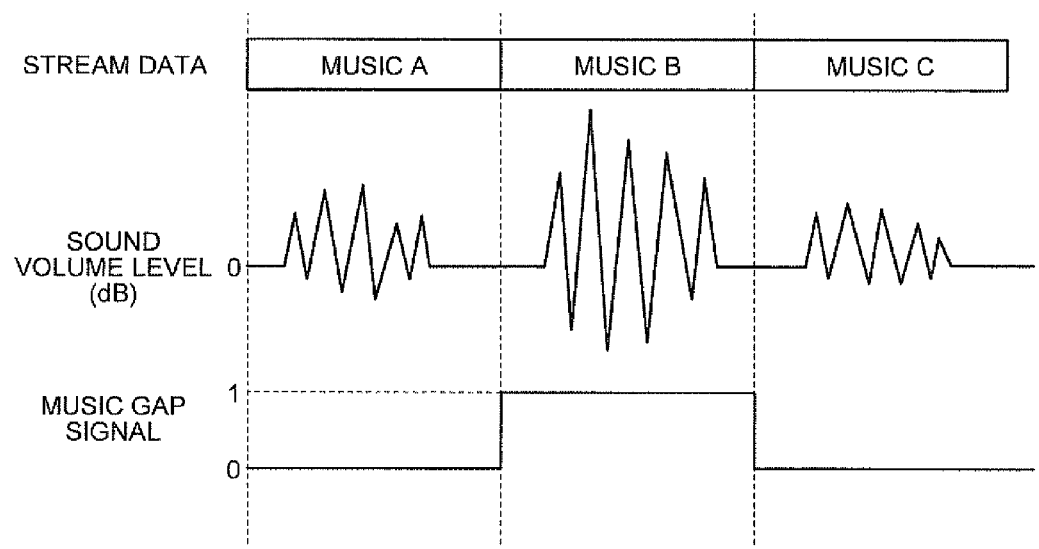
FIG. 4 is a schematic diagram illustrating an music gap signal.

In the following, the relationship between the stream data and a music gap signal will be described with reference to FIG. 4. FIG. 4 is a schematic diagram illustrating a music gap signal. As illustrated in FIG. 4, a case will be described in which stream data contains pieces of music A, music B, and music C.

The sound volume level associated with each piece of music is illustrated in the middle portion of FIG. 4. An audio signal with a sound volume level of 0 represents a silent state. As illustrated in the middle portion of FIG. 4, a silent period continues for a predetermined period of time in a music gap in the stream data.

If the audio equipment 20 transmits the stored stream data to the audio apparatus 10, the audio equipment 20 notifies, for each piece of music, the audio apparatus 10 of a signal 0 or 1 as a music gap signal, i.e. information used to notify a change in a music gap.

Specifically, as illustrated in the lower portion of FIG. 4, the audio equipment 20 notifies that there is a change in music by transmitting a music gap signal 0 when data on the music A is transmitted, by transmitting a music gap signal 1 when data on the music B is transmitted, and by transmitting the music gap signal 0 when the music C is transmitted. Furthermore, because the audio equipment 20 transmits a music gap signal to the audio apparatus 10 by using a transmission path that is different from that of the stream data (or transmits data as data independent of the stream data), an irregular difference, which is different from the music gap of the sound that is actually being played back by the audio apparatus 10, occurs.

In the following, a music gap determining process performed by the music gap determining unit 15b will be described in detail with reference to FIG. 5. FIG. 5 is a schematic diagram illustrating the music gap determining process.

A description will be given of three cases in which the relationship differs between the time at which the music gap detecting unit 15a receives a music gap signal and the time at which the music gap determining unit 15b receives information on a silent period of music data that is being played back by the playback unit 16a.

Figure 5A:
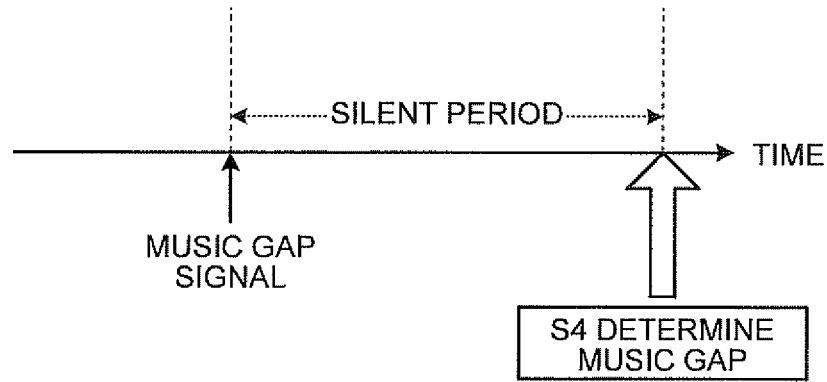
FIGS. 5A and 5B and FIG. 5C are schematic diagrams each illustrating an music gap determining process.
Figure 5B:
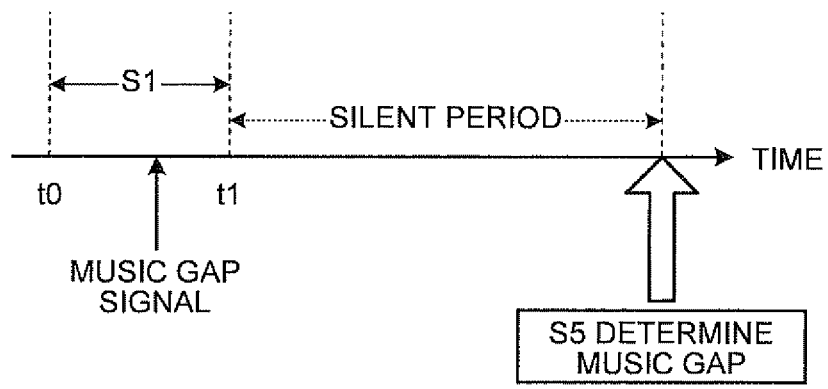

FIG. 5A illustrates a case in which the time at which a music gap signal is received is the same as the start time of the silent period. FIG. 5B illustrates a case in which the time at which the music gap signal is received is before the start time of the silent period.

Figure 5C:
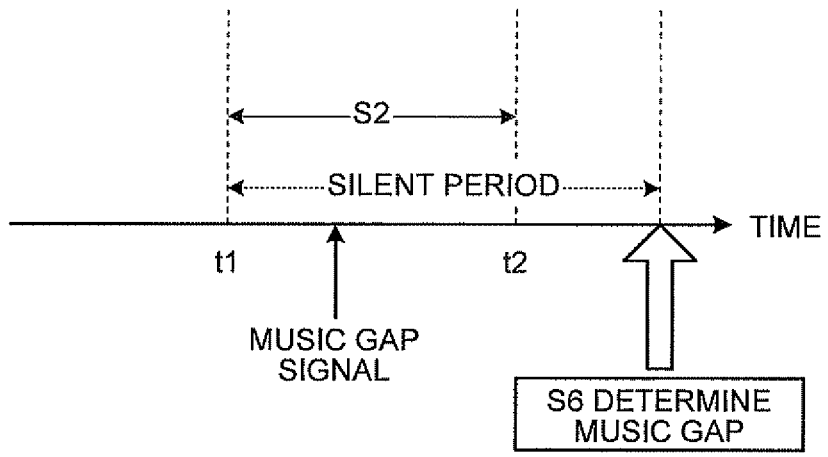

FIG. 5C illustrates a case in which the time at which the music gap signal is received is after the start time of the silent period. The music gap that is determined at this stage indicates a music gap of a sound that is actually being played back by the playback unit 16a. The horizontal axis each illustrated in FIGS. 5A, 5B, and 50 indicates the time.

First, as illustrated in FIG. 5A, if the time at which the music gap signal is received is the same as the start time of the silent period, the music gap determining unit 15b receives a music gap signal and determines the point of time at which a predetermined period of time has elapsed in the silent period to be a music gap (S4).

FIG. 5B illustrates a case in which a time lag occurs between the time at which the stream data received by the buffering unit 14c is buffered and the time at which the stream data 13a stored in the storing unit 13 is decoded by the decoding unit 14d. In such a case, the time at which the music gap signal is received is before the start time of the silent period.

Furthermore, because the time lag varies, the music gap determining unit 15b determines, if the music gap signal is received during a time period between a predetermined time period (S1) before the start time of the silent period and the start time of the silent period, the point of time at which a predetermined period of time has elapsed in the silent period to be a music gap (S5).

Specifically, if the music gap determining unit 15b receives a music gap signal, the music gap determining unit 15b determines, if a silent period starts within a predetermined time period (S1) after the music gap signal is received, the point of time at which a predetermined period of time has elapsed in the silent period to be a music gap (S5).

Furthermore, in some cases, the time at which the music gap signal is received from the audio equipment 20 may be delayed depending on the communication state between the audio equipment 20 and the audio apparatus 10. In such a case, as illustrated in FIG. 5C, the time at which the music gap signal is received is after the start time of the silent period.

Accordingly, the music gap determining unit 15b determines, if the music gap signal is received within a predetermined time period (S2) after the start time of the silent period (t1), the point of time at which a predetermined period of time has elapsed in the silent period to be a music gap (S6).

Specifically, if the music gap determining unit 15b receives a music gap signal, the music gap determining unit 15b determines that there is a music gap if it detects a silent period, if the silent period starts before the music gap signal is received, if a time period from the start of the silent period until the music gap signal is received is within the predetermined time period (S2), and if a predetermined period of time has elapsed in the silent period (S6).

By determining the music gap in this way, the audio apparatus 10 can prevent the time lag between buffering and decoding or prevent erroneous detection of a music gap due to a music gap signal being delayed.

In stream data stored in a non-stop compact disc (CD), if a music gap signal is received, a short silent period is included in the music gap. However, when using a non-stop CD, a sound is preferably played back without performing sound volume correction on each piece of music.

Accordingly, as described above, the audio apparatus 10 determines there to be a music gap if a predetermined silent period has elapsed, thereby the audio apparatus 10 can prevents erroneous detection of the music gap even if a non-stop CD is used and can appropriately perform sound volume correction in accordance with music gaps. A threshold of the duration of a silent period and a threshold of the difference between the start time of the silent period and the time at which the music gap signal is received (S1, S2) are defined as predetermined thresholds and can be changed by the user.

In the following, a stream data playback process performed by the audio apparatus 10 will be described in detail with reference to FIG. 6. FIG. 6 is a sequence diagram illustrating the outline of the flow of the stream data playback process. In this case, a case will be described in which the stream data illustrated in FIG. 1 is received.

If stream data is received from the audio equipment 20, first, the multimedia integrated microcomputer 14 receives a piece of music α and performs buffering on the stream data contained in the received music α (Step S101).

Then, the multimedia integrated microcomputer 14 receives a music gap signal (Step S102) and transmits the music gap signal to the audio microcomputer 15, thereby the audio microcomputer 15 detects a music gap (Step S103).

Subsequently, the multimedia integrated microcomputer 14 receives a silent period and performs buffering on the stream data of the received silent period (Step S104). Furthermore, the multimedia integrated microcomputer 14 receives a piece of music β and performs buffering on the stream data of the received music β (Step S105).

Then, the multimedia integrated microcomputer 14 decodes the stream data 13a subjected to buffering (Step S106) and sends the decoded data to the DSP 16.

The DSP 16 performs, on decoded data and for each piece of music, a sound-volume correction process or an audio-signal adjusting process, performs digital to analog (D/A) conversion and electrical power amplification on the audio signal that has been subjected to the sound volume correction or adjustment, and sends the audio signal to the speaker 30 to sequentially play back music from the music α (Step S107). Furthermore, the DSP 16 sends, to the audio microcomputer 15, information on the silent period of the music data that is being played back.

Then, the audio microcomputer 15 performs a determining process on the music gap on the basis of the music gap signal and on the basis of the information on the silent period (Step S108). If the audio microcomputer 15 determines there to be the music gap, the audio microcomputer 15 notifies the DSP 16 of the music gap.

As described above in detail using FIGS. 5A, 5B, and 5C, three patterns are used during the determining process to determined if there is a music gap: a pattern in which the time at which a music gap signal is received is the same as the start time of the silent period; a pattern in which the time at which a music gap signal is received is before the start time of the silent period; and a pattern in which the time at which a music gap signal is received is after the start time of the silent period.

Thereafter, if the DSP 16 receives, from the audio microcomputer 15, a notification of a music gap, the DSP 16 performs sound volume correction on the subsequent music (music β) (Step S109), plays back the music β subjected to the sound volume correction (Step S110), and ends the series of processes in the stream data playback process.

As described above, in the embodiment, if the audio microcomputer receives a music gap signal and if a predetermined period of time has elapsed in the silent period, this state is determined to be a music gap of a sound that is actually being played back by the DSP. Accordingly, even if stream-type data in which successive multiple music data are contained in a single block of data is received, a music gap can be accurately detected.

In the embodiment described above, a case has been described in which the embodiment is used for stream data stored in audio equipment. However, the embodiment may also be used for stream data that is received from another device, such as a DTV or a DVD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An audio apparatus comprising:
    an audio signal receiving unit that receives an audio signal in which successive multiple music data are contained in a single block of data;
    a music gap signal receiving unit that receives a music gap signal indicating a music gap of the music data;
    a playback unit that plays back the audio signal received by the audio signal receiving unit; and
    a determining unit that determines a point of time at which a predetermined period of time has elapsed in a silent period in the audio signal that is played back by the playback unit to be the music gap after a time at which the music gap signal is received by the music gap signal receiving unit.

2. The audio apparatus according to claim 1, wherein, if the music gap signal is received by the music gap signal receiving unit within a predetermined time period including a boundary of the music data being a starting point of the silent period and if the predetermined time period of time has elapsed in the silent period in the audio signal that is played back by the playback unit, the determining unit determines that the point of time at which the predetermined period of time has elapsed in the silent period that is played back by the playback unit to be the music gap.

3. The audio apparatus according to claim 2, wherein, if the silent period in the audio signal that is played back by the playback unit starts within the predetermined time period after the music gap signal is received by the music gap signal receiving unit, the determining unit determines that the point of time at which the predetermined period of time has elapsed in the silent period that is played back by the playback unit to be the music gap.

4. The audio apparatus according to claim 2, wherein, if the music gap signal is received by the music gap signal receiving unit within the predetermined time period after the start of the silent period in the audio signal that is played back by the playback unit, the determining unit determines the point of time at which the predetermined period of time has elapsed in the silent period that is played back by the playback unit to be the music gap.

5. The audio apparatus according to claim 1, further comprising an accumulating unit that accumulates, for each predetermined amount, the audio signal received by the audio signal receiving unit, wherein the playback unit plays back the audio signal accumulated by the accumulating unit.

6. The audio apparatus according to claim 2, further comprising an accumulating unit that accumulates, for each predetermined amount, the audio signal received by the audio signal receiving unit, wherein the playback unit plays back the audio signal accumulated by the accumulating unit.

7. The audio apparatus according to claim 3, further comprising an accumulating unit that accumulates, for each predetermined amount, the audio signal received by the audio signal receiving unit, wherein the playback unit plays back the audio signal accumulated by the accumulating unit.

8. The audio apparatus according to claim 4, further comprising an accumulating unit that accumulates, for each predetermined amount, the audio signal received by the audio signal receiving unit, wherein the playback unit plays back the audio signal accumulated by the accumulating unit.

9. An audio apparatus comprising:
audio signal receiving means for receiving an audio signal in which successive multiple music data are in a single block of data;
music gap signal receiving means for receiving a music gap signal indicating a music gap of the music data;
playing back means for playing back the audio signal received by the audio signal receiving means; and
determining means for determining a point of time at which a predetermined period of time has elapsed in a silent period in the audio signal that is played back by the playing back means to be the music gap after a time at which the music gap signal is received by the music gap signal receiving means.

* * * * *